Feb. 19, 1952     C. M. THOMAS     2,586,187
MOTIVE FUEL CONVERTER
Filed March 2, 1950
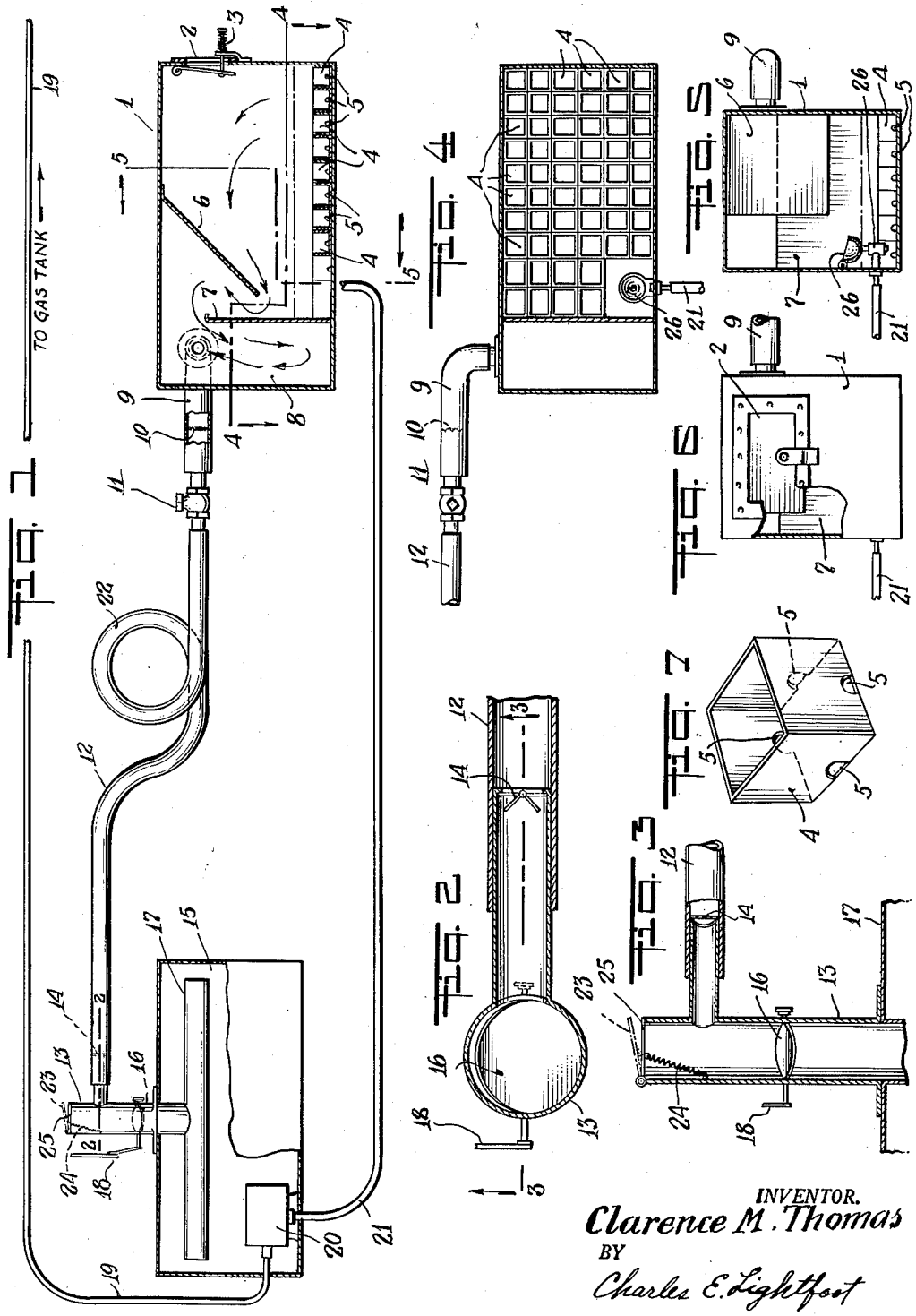
INVENTOR.
Clarence M. Thomas
BY
Charles E. Lightfoot
ATTORNEY Patented Feb. 19, 1952

2,586,187

UNITED STATES PATENT OFFICE 2,586,187

MOTIVE FUEL CONVERTER

Clarence M. Thomas, Houston, Tex., assignor of one-fourth to Lawrence H. Stahl, Harris County, Tex.

Application March 2, 1950, Serial No. 147,163

2 Claims. (Cl. 261—119)

This invention relates to a motive fuel converter.

An object of the invention is to provide equipment of the character described which will take a motive fluid in liquid state from a reserve tank and convert it into gas and deliver the same to the manifold of a motor or to any other point of consumption.

It is a further object of the invention to provide equipment of the character described especially designed for use in connection with internal combustion motors and which will dispense with the necessity of a carburetor.

Another object of the invention is to provide equipment of the character described which will convert the liquid fuel into a gas and deliver the gas in a dry state into the intake manifold of a combustion motor.

Other objects and advantages will be apparent from the following specification which is illustrated by the accompanying drawings wherein:

Figure 1 is a side elevational view, partly in section, with arrows indicating the travel of the gas through the mixing tank.

Figure 2 is a top sectional view of the manifold connection, taken on the line 2—2 of Figure 1.

Figure 3 is a side elevational view taken on the line 3—3 of Figure 2.

Figure 4 is a top plan view taken on the line 4—4 of Figure 1, illustrating the baffle chambers in the mixing tank.

Figure 5 is an end elevational view, in section, of the mixing tank taken on the line 5—5 of Figure 1.

Figure 6 is an end view of the mixing tank, partly broken away, and

Figure 7 is an enlarged perspective view of the baffle chamber employed.

Referring now more particularly to the drawings, the numeral 1 designates a tank which is equipped with an air intake valve 2. A suitable spring loaded adjusting nut 3 is employed to regulate the opening and closing of the valve 2. A series of baffle chambers 4 are mounted on the floor of the tank 1. Each chamber has a series of ports as 5, 5. A baffle plate 6 is mounted on the top wall of the tank 1 and extends downwardly and at an abrupt angle into the tank. An upstanding partition 7 extends from the floor of the tank 1, adjacent one end thereof, to a point near the top wall of the tank 1, forming a drying chamber 8. A conduit 9 leads from said chamber 8 in which a filtering screen 10 is mounted. The conduit 9 leads into a safety valve as 11 which may take the form of a conventional ball check valve and from the outlet side of the safety valve 11, a conduit 12 of sufficient length to condense the wet vapors flowing therethrough, extends into the intake pipe 13 leading into the manifold 17 of the combustion motor 15. A back pressure valve 14 is mounted in the conduit 12 adjacent the said intake pipe 13. A hinged cover 23 is mounted on the extended free end of the intake pipe 13 and has a spring 24 constantly urging said cover into closed position. A seat, as 25, is preferably ground into the end of the pipe 13 to receive the cover 23 when in closed position. A manually controlled intake valve 16 is mounted in said pipe 13 between the valve 14 and the manifold 17, and is manipulated by the lever 18.

A conduit 19 extends from the fuel reservoir (not shown) to a suitable fuel pump as 20 and the fuel is pumped from said reservoir to the mixing tank 1 through the conduit 21. The conduits 9, 12 are of comparatively greater diameter than the usual fuel conduits used on combustion motors and because the conduit 12 must be of sufficient length to bring about partial condensation, it may be coiled one or more times as at 22. The increased diameter of the conduits 9, 12 hasten the drying process of the vapor flowing therethrough.

A float valve as 26 is mounted in the tank 1 and is in connection with the conduit 21 and maintains the desired level of fuel in the tank 1.

As the motor 15 is started, the fuel pump 20 will pump fuel into the tank 1 through the valve 26. The suction created by the manifold through the conduits 12, 9, draw air through the valve 2 and this air will be directed by the valve 2 downwardly onto the surface of the fuel in the tank 1, agitating the fuel, causing the fuel to vaporize and the vapor thus given off being drawn by the suction of the manifold 17, together with the air drawn in through the valve 2, against the baffles 6 and 7 and into the chamber 8, thence through the conduit 9 and the screen 10, through the safety valve 11 into the conduit 12. These vapors will be wet when entering the conduit 9 and after passing through the screen 10, will be partially dried, but after passing through a portion of the conduit 12 will condense and the condensate will flow back into the tank 8 and only the dry vapors will continue on through the conduit 12 into the manifold 17. The valve 16 will be manually manipulated to control the rate of flow through the intake pipe 13 into the manifold 17. In the event of a backfire from the motor 15, the force of the backfire will close the back pressure valve 14, preventing the backfire from passing into the conduits 12, 9, and forcing the spring loaded hinged cap 23 open, permitting the force of the backfire to be spent therethrough.

While the foregoing illustrates a preferred form of the invention, it is to be understood that it is by way of illustration only, the broad principle of the invention being defined by the appended claims.

What I claim is:

1. In a motive fuel converter, a mixing tank, a feed line entering the tank, a delivery line leading from the tank, and a series of baffle chambers mounted on the floor of the tank having interconnecting ports, an air intake valve in said tank having means for directing incoming air onto the surface of the fuel in said tank, baffles extending from the top and bottom walls of said tank between said chambers and said delivery line.

2. In a motive fuel converter, a mixing tank, a feed line entering the tank, a delivery line leading from the tank, a series of baffle chambers mounted on the floor of the tank having interconnecting ports, an air intake valve in said tank having means for directing incoming air onto the surface of motive fuel in said tank, baffles extending from the top and bottom walls of said tank between said chambers and said delivery line, means in said delivery line for separating the wet vapors from the dry vapors and returning the wet vapors to said tank.

CLARENCE M. THOMAS.

REFERENCES CITED

The following references are of record in the file of this patent:

UNITED STATES PATENTS

| Number | Name | Date |
|---|---|---|
| 951,501 | Hancock | Mar. 8, 1910 |
| 1,524,333 | Brandt et al. | June 27, 1925 |
| 1,634,022 | Dalton | June 28, 1927 |
| 2,000,498 | Rickabaugh | May 7, 1935 |
| 2,030,922 | Hirth | Feb. 18, 1936 |